United States Patent
Legner

(10) Patent No.: US 8,382,625 B2
(45) Date of Patent: *Feb. 26, 2013

(54) DRIVETRAIN DEVICE OF A VEHICLE WITH A GEAR UNIT

(75) Inventor: Jurgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 450 days.

This patent is subject to a terminal disclaimer.

(21) Appl. No.: 12/707,988

(22) Filed: Feb. 18, 2010

(65) Prior Publication Data

US 2010/0240483 A1    Sep. 23, 2010

(30) Foreign Application Priority Data

Mar. 17, 2009    (DE) .......................... 10 2009 001 602

(51) Int. Cl.
*F16H 47/04* (2006.01)
*F16H 37/02* (2006.01)
*F16H 37/00* (2006.01)

(52) U.S. Cl. ............ 475/73; 475/75; 475/207; 74/730.1

(58) Field of Classification Search .................... 475/32, 475/72, 73, 75, 80, 83, 207, 218, 302; 74/331, 74/730.1, 718, 665 L, 665 N
See application file for complete search history.

(56) References Cited

U.S. PATENT DOCUMENTS

| | | | | |
|---|---|---|---|---|
| 3,273,515 A | | 9/1966 | Oestreicher et al. | |
| 4,215,545 A | * | 8/1980 | Morello et al. | 60/413 |
| 4,242,922 A | * | 1/1981 | Baudoin | 477/68 |
| 4,959,962 A | * | 10/1990 | Hagin et al. | 60/626 |
| 5,787,756 A | | 8/1998 | Leber et al. | |
| 5,890,981 A | | 4/1999 | Coutant et al. | |
| 6,056,657 A | | 5/2000 | Garnett | |
| 2005/0192148 A1 | * | 9/2005 | Hasegawa et al. | 475/72 |
| 2008/0039262 A1 | * | 2/2008 | Cronin et al. | 475/73 |
| 2009/0036248 A1 | * | 2/2009 | Mueller et al. | 475/72 |
| 2009/0084102 A1 | * | 4/2009 | Mueller et al. | 60/413 |
| 2009/0319135 A1 | | 12/2009 | Petzold et al. | |
| 2010/0069193 A1 | * | 3/2010 | Mueller et al. | 475/78 |
| 2010/0184551 A1 | * | 7/2010 | Hiraoka et al. | 475/80 |
| 2010/0197438 A1 | * | 8/2010 | Legner | 475/72 |
| 2010/0210389 A1 | * | 8/2010 | Legner et al. | 475/72 |
| 2010/0236348 A1 | * | 9/2010 | Legner | 74/473.11 |
| 2010/0236361 A1 | * | 9/2010 | Legner | 74/730.1 |
| 2011/0021302 A1 | * | 1/2011 | Panizzolo et al. | 475/207 |

FOREIGN PATENT DOCUMENTS

| | | |
|---|---|---|
| CH | 418 382 | 2/1967 |
| DE | 2 322 457 | 11/1974 |
| DE | 23 54 280 A1 | 5/1975 |
| DE | 43 23 358 C1 | 5/1994 |
| DE | 44 44 843 A1 | 6/1996 |
| DE | 197 51 993 A1 | 5/1998 |

(Continued)

*Primary Examiner* — Roger Pang
(74) *Attorney, Agent, or Firm* — Davis & Bujold, PLLC

(57) ABSTRACT

A device (2) for a vehicle drivetrain (1) with a transmission unit (3) for changing various transmission ratios and with a hydraulic device (4). The device (2) can provide a drive torque in the area of the drive output (5) of the vehicle drivetrain (1) and in whose area a drive output torque of the vehicle drivetrain (1) can be at least partially supported. A reversing gear system (6) is connected, upstream of the transmission unit (3), for reversing the rotation direction and the hydraulic device (4) can be brought into active connection with the transmission unit (3) by way of the reversing gear system (6).

11 Claims, 2 Drawing Sheets

FOREIGN PATENT DOCUMENTS

| | | |
|---|---|---|
| DE | 102 16 002 A1 | 5/2003 |
| DE | 102 59 424 A1 | 7/2004 |
| DE | 10 2005 060 992 A1 | 6/2007 |
| DE | 10 2006 060 014 A1 | 6/2007 |
| DE | 10 2006 018 435 A1 | 11/2007 |
| DE | 10 2006 030 791 A1 | 1/2008 |
| DE | 10 2006 040 476 A1 | 3/2008 |
| DE | 10 2007 018 999 A1 | 10/2008 |
| DE | 10 2007 021 436 A1 | 11/2008 |
| WO | 2006/042434 A1 | 4/2006 |
| WO | 2008/000602 A1 | 1/2008 |
| WO | 2008/128865 A1 | 10/2008 |
| WO | 2008/135158 A1 | 11/2008 |

\* cited by examiner

DRIVETRAIN DEVICE OF A VEHICLE WITH A GEAR UNIT

This application claims priority from German patent application serial no. 10 2009 001 602.3 filed Mar. 17, 2009.

FIELD OF THE INVENTION

The invention concerns a device for a vehicle drivetrain.

BACKGROUND OF THE INVENTION

A device for a vehicle drivetrain with a power branching transmission and a reversing or turnover gear system is known from DE 10 2007 018 999 A1. A drive input of the power branching transmission drives a planetary gear unit via the reversing gearing, in the area of which the power is divided between a hydraulic power branch and a mechanical power branch. The hydraulic power branch consists of a pump and two motors. In addition, a hydraulic supply pump is connected to the drive of the power branching transmission, which supplies pressure fluid to the closed circuit of the hydraulic pump and hydraulic motors in the sense of a feed pump.

Disadvantageously, however, neither in traction operation nor in thrust operation can a drive torque be produced at the drive output of a vehicle drivetrain or an applied drive output torque be supported by means of the additional hydraulic device or the hydraulic supply pump. Moreover, by means of the hydraulic device no recuperative operation can be carried out, during which a thrust torque in the drivetrain can be used to recover energy and by virtue of which a vehicle can be operated more efficiently.

A hydrostatic drive with which braking energy can be recovered is described in DE 10 2006 060 014 A1. The hydrostatic drive is formed with a hydro-pump and a hydro-motor connected to one another by a first and a second working line. Furthermore, the hydrostatic drive is made with a first reservoir and a second reservoir, the first reservoir being designed for the storage of pressure energy and being connected to the first working line by a first seat valve and to the second working line by a second seat valve. The second reservoir can be connected to the first working line by a third seat valve and to a second working line by a fourth seat valve.

Disadvantageously, this hydrostatic drive is characterized by a complex structure and high production costs, for which reasons the drive is only of restricted suitability for use in a hybrid vehicle drivetrain.

SUMMARY OF THE INVENTION

Thus, the purpose of the present invention is to provide a device for a vehicle drivetrain with a transmission unit for changing various transmission ratios and with a hydraulic device, which is characterized by a simple and inexpensive structure and by means of which, at the drive output of a vehicle drivetrain, both a drive torque can be provided and an output torque can be supported by means of the hydraulic device.

The device according to the invention for a vehicle drivetrain is made with a transmission unit for changing various transmission ratios and with a hydraulic device. By means of the hydraulic device a drive torque can be produced at the drive output of the vehicle drivetrain. In addition, in the area of the hydraulic device a drive output torque of the vehicle drivetrain can be at least partially supported. On the transmission input side a reversing gear system is connected upstream from the transmission unit in order to enable the rotation direction to be reversed. The hydraulic device can be brought into active connection with the transmission unit via the reversing gear system.

In a simple manner, the preferably direct connection of the hydraulic device to the drive input of the vehicle drivetrain and to the transmission unit via the reversing gearing makes it possible to use the functionality of the hydraulic device over the full operating range, i.e. over the entire speed range of the vehicle and also in both driving directions. In addition, the torque to be provided by the hydraulic device in each case is low by virtue of the connection of the hydraulic device on the transmission input side, since it is adapted by the transmission ratio set in the area of the transmission unit to the operating condition of the vehicle drivetrain at the time and is available, correspondingly transformed, at the drive output of the vehicle drivetrain.

The connection of the hydraulic device to the transmission unit via the reversing gear system also has the advantage that the device can be made without an additional axle spindle when the hydraulic device can be mounted in the area of the available axle separation to the drive flange of the transmission unit.

If this is not possible because of the external dimensions of the hydraulic device, the hydraulic device can also be coupled by the reversing gearing to the transmission unit via an additional axle spindle, by virtue of which a larger axle distance to the drive flange of the transmission unit can be made available. Then, the device can be made with hydraulic devices that are more high-powered. Furthermore, an additional axle spindle offers the possibility of providing a transmission ratio between the hydraulic device and the transmission unit because of the larger structural space available, within a large transmission ratio range adapted with great flexibility to the application concerned.

If the feasible axle separations do not suffice for the direct incorporation of the hydraulic device with or without an additional axle spindle, it is also possible to mount the hydraulic device the required distance away from the transmission unit in the vehicle and connect it to the transmission unit by means of a universal shaft, and in such a design of the device according to the invention only one drive flange is needed in the area of the transmission unit.

In an advantageous further development of the device according to the invention, a plurality of range clutches are provided in the area of the output of the transmission unit for producing various transmission ratio ranges, within each of which the transmission ratio of the transmission unit can be varied continuously. Thus, a vehicle made with the device can be operated over a large speed range, optimally adapted to the operating condition of the vehicle in each case.

In a simply designed further development of the device according to the invention that can be actuated with little effort, the hydraulic device can be brought into active connection, via a gearwheel, with a gearwheel of the reversing gear system.

To obtain start-stop operation, in a further advantageous embodiment of the device according to the invention the hydraulic device is connected to an auxiliary drive output shaft. In this embodiment a drive machine coupled to the auxiliary drive output shaft is entrained during recuperative operation of the hydraulic unit without a distinct separating clutch, whereby the efficiency is impaired during the recuperative operation.

An embodiment of the device according to the invention that is favorable in terms of structural space comprises a hydraulic machine of the hydraulic device, which can be operated in both rotation directions.

To be able in a simply designed manner to provide at the drive output of the vehicle drivetrain a drive torque by means of the hydraulic device, or at least partially to support in its area an output torque of the vehicle drivetrain and preferably to be able to recover braking energy in the area of the hydraulic device, in an advantageous further development of the device according to the invention the hydraulic machine is in active connection on its pressure side with a pressure medium container unit and on its suction side with a hydraulic fluid reservoir.

A further development of the device characterized by a structure of simple design comprises, between the pressure side of the hydraulic machine and the pressure medium container unit, a one-way valve that can be actuated, which blocks the connection between the hydraulic machine and the pressure medium container unit, if there is a positive pressure gradient between the pressure medium container unit and the pressure side of the hydraulic machine.

In a simply actuated embodiment of the device according to the invention, the one-way valve device can be actuated by a 3/2-way valve.

To avoid unacceptably high loads in the area of the hydraulic device, in a further development of the device according to the invention the hydraulic device comprises a pressure-limiting valve device for limiting the maximum operating pressure.

An embodiment of the device according to the invention which is also simple to operate, is formed with a pressure sensor for monitoring a storage pressure of the pressure medium container unit.

To be able to obtain pure hybrid driving operation as free from losses as possible by means of the hydraulic device, between the area where the hydraulic device and the reversing gear system are connected and an area of the vehicle drivetrain in which a drive machine of the vehicle drivetrain can be coupled to the reversing gear system, a shift element can be provided in order to enable the active connection between the drive machine and the reversing gearing, and the hydraulic device that can be coupled thereto, to be optionally formed.

BRIEF DESCRIPTION OF THE DRAWINGS

Other advantages and advantageous further developments of the invention emerge from the claims and from the example embodiment whose principle is described with reference to the drawing, which shows:

DETAILED DESCRIPTION OF THE PREFERRED EMBODIMENTS

Figure 1:
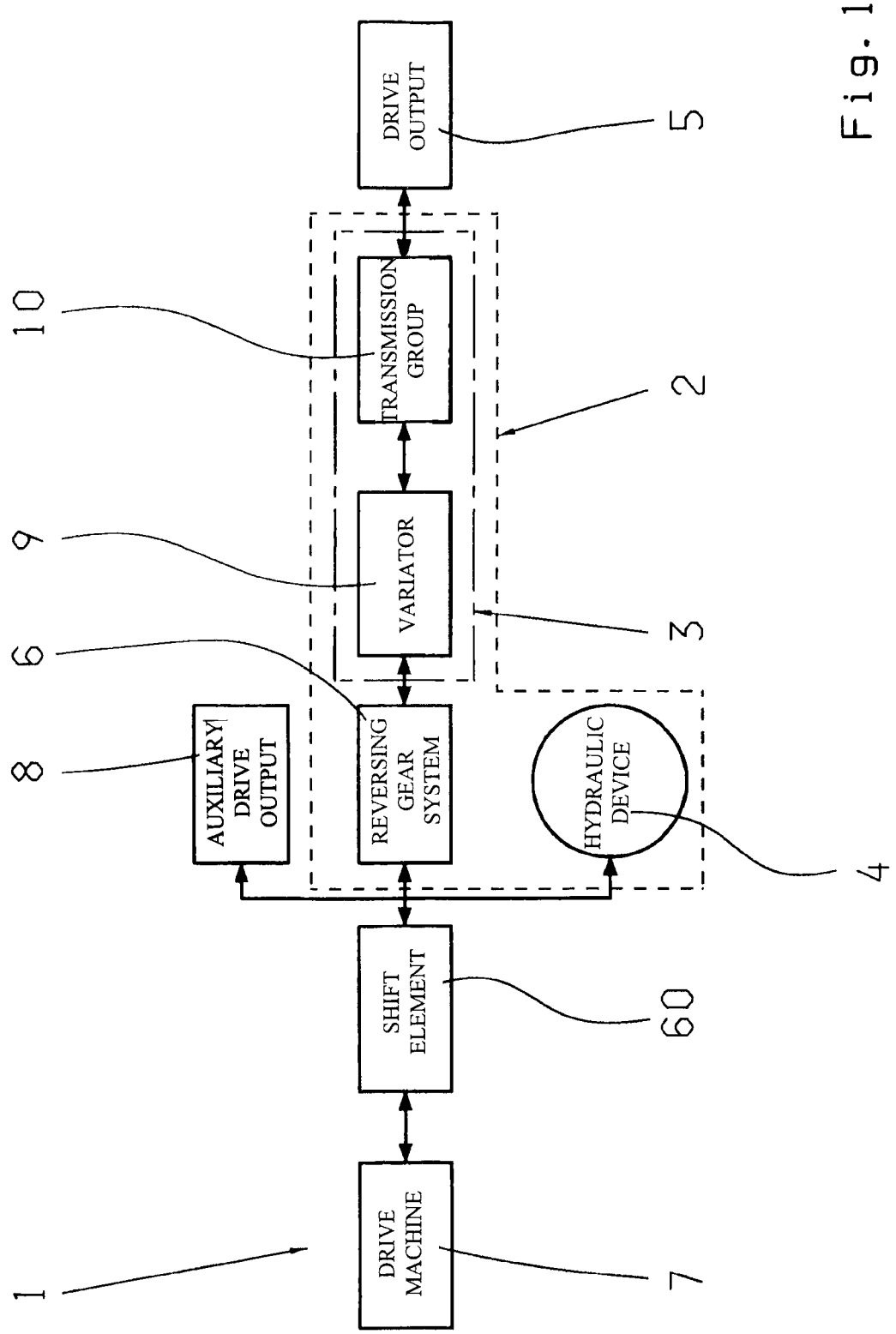
FIG. 1: A very schematic representation of a vehicle drivetrain made with the device according to the invention.

FIG. 1 shows a vehicle drivetrain 1 of a vehicle made as a working machine such as a wheel loader or an agricultural machine. The vehicle drivetrain 1 is made with a device 2 which in the present case comprises, inter alia, a transmission unit 3 for changing various transmission ratios and a hydraulic device 4. By means of the hydraulic device 4, during traction operation a drive torque can be produced in the area of a drive output 5 of the vehicle drivetrain 1. Furthermore, during thrust operation of the vehicle drivetrain 1, in the area of the hydraulic device 4 a drive output torque of the vehicle drivetrain 1 can be supported, at least in part.

Upstream from the transmission unit 3 on its transmission input side is connected a reversing gear system 6 for enabling a reversal of the rotation direction, the hydraulic device 4 being arranged in the power flow of the vehicle drivetrain 1 between a drive machine 7 of the vehicle drivetrain 1 and the reversing gear system 6. This means that in the area of the reversing gearing 6, the operating mode can be switched between forward and reverse driving.

In the connection area between the drive machine 7 of the vehicle drivetrain 1, in this case in the form of an internal combustion engine, and the reversing gear system 6, a so-termed auxiliary drive output 8 branches off, by means of which various appliances of the vehicle made with the vehicle drivetrain 1 can be driven, depending on the state of operation. The transmission unit 3 comprises a variator 9 and a transmission group 10 shown in greater detail in FIG. 2, which comprises range clutches K1 to K3.

Figure 2:
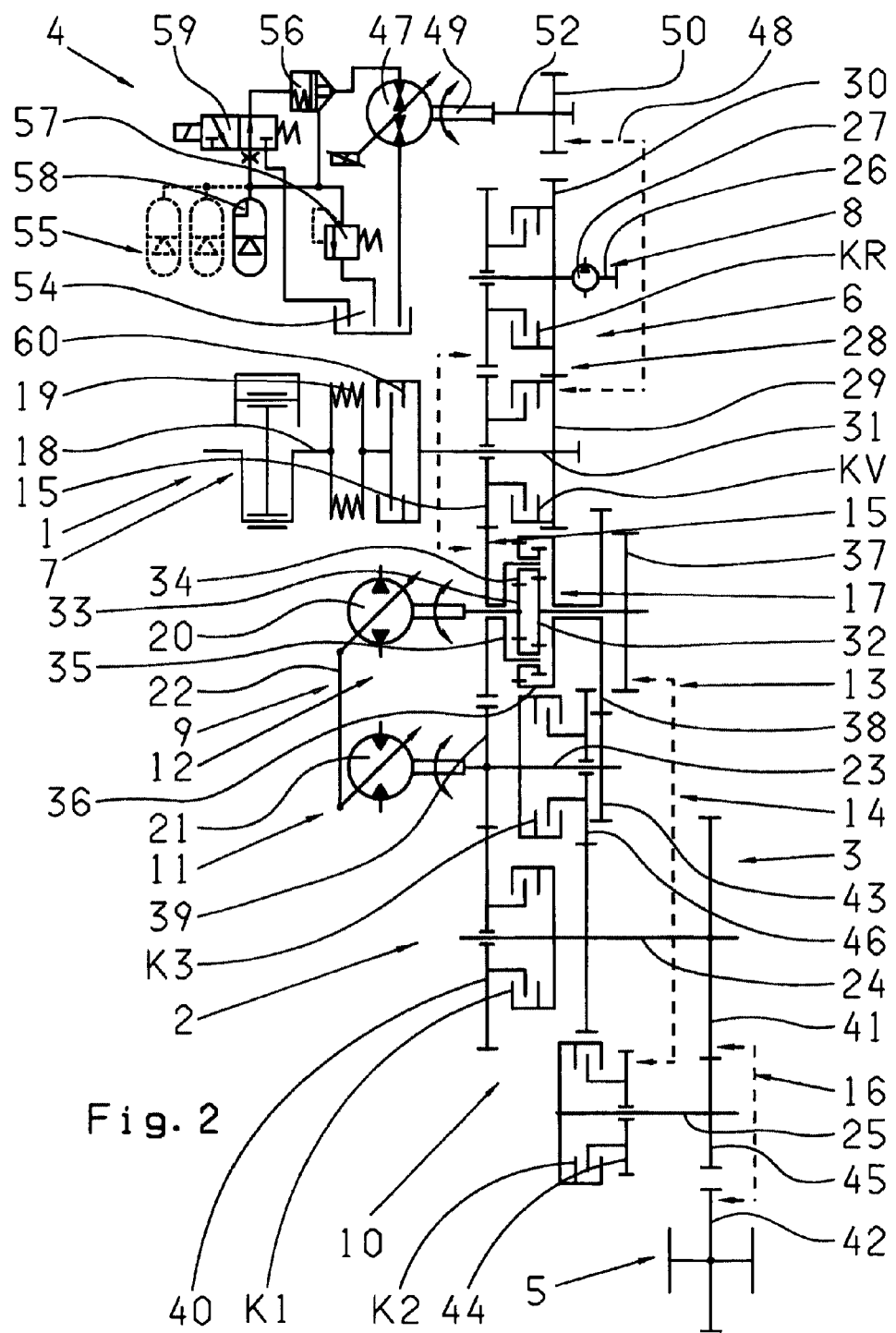
FIG. 2: A detailed representation of the vehicle drivetrain according to FIG. 1

FIG. 2 shows a hydraulic circuit diagram of the hydraulic device 4 and a gearwheel layout comprising the reversing gear system 6, the transmission unit 3 and the drive output 5. The transmission unit 3 is configured with secondary coupled power branching and, by virtue of the range clutches K1 to K3, in the forward and reverse driving modes non-synchronous range changes between three transmission ratio ranges of the transmission unit 3 can be carried out. Thus, the transmission unit 3 is made with three driving ranges for forward and reverse driving, which can be obtained respectively by disconnecting one of the shift elements K1, K2 or K3 and by connecting at least one of the shift elements K1, K2 or K3.

Part of the torque provided in each case by the drive machine 7 can be transmitted in a first power branch 11 of the transmission unit 3 via a hydrostatic device 12 and the other part of the torque in a second power branch 13 via a mechanical device 14 between a transmission input 15 or transmission input shaft and a transmission output 16 or transmission output shaft. The two power branches 11 and 13 of the transmission unit 3 are in active connection via a planetary gear system 17 of the transmission unit 3.

Between a motor output shaft 18 of the drive machine 7 and the transmission input shaft 15 is arranged a so-termed oscillation damper 19, by means of which rotational irregularities in the area of the drive machine 7 are damped so that only a small fraction of them gets through to the reversing gear system 6 and the remainder of the vehicle drivetrain 1 of a vehicle or a construction machine.

The hydrostatic device 12 of the first power branch 11 comprises a pump 20 and a motor 21 actively connected thereto by a hydraulic circuit (not shown in detail in the drawing), which are moved by a common yoke 22 and are designed as oblique axle units. However, depending on the application concerned, it is also possible for the pump and motor of the hydrostatic device to be adjusted independently of one another and to have some other, also suitable structural form.

In addition, the transmission unit 3 and the reversing gear system 6 are made as countershaft transmissions with a plurality of countershafts 23 to 26 and 31, a distance apart from one another, such that the transmission unit 3 and reversing gear system 6 take up relatively little structural space in the axial direction and a relatively large amount of space in the radial or vehicle height direction, the large radial space requirement being used to bridge an axial distance between the motor output shaft 18 of the drive machine 7 or the transmission output shaft 16 and the driven axles of the vehicle in this case made as a wheel loader.

In the present case the reversing gear system 6 comprises two driving direction shift elements KR and KV, by means of which the mode can be switched between forward driving and reverse driving. On the countershaft 26 associated with the drive direction shift element KR for reverse driving is arranged a geared pump 27, so that the countershaft 26 can be driven by the drive machine 7 via a gearwheel pair 28.

The transmission ratio of the gearwheel pair 28, which is formed of a first gearwheel 29 connected in a rotationally fixed manner on the other countershaft 31 of the reversing gear system 6 and is made as a spur gear, and a second gearwheel 30, is such that the rotation speed of the other countershaft 31 in the direction of the countershaft 26 of the reversing gear system 6 is stepped up. Consequently, the geared pump 27 in this case runs at a speed 20% higher than the drive machine and, with this design of the reversing gear system 6, can be made smaller compared with a geared pump arranged directly on the countershaft 31 which rotates substantially at the same speed as the drive machine 7.

By means of the geared pump 27, besides a hydraulic circuit that connects the pump 20 and the motor 21 of the hydrostatic device 1 to one another, this being formed as a closed circuit, a lubrication and cooling circuit as well can be pressurized with hydraulic fluid. In addition the shift elements K1 to K3 and the drive direction shift elements KR and KV can be pressurized by the geared pump 27 to their hydraulic working pressure and thus changed from an essentially disengaged, to an essentially fully engaged operating condition.

Besides the geared pump 27, in the area of the countershaft 26 of the reversing gear system 6 a further power take-off takes place, which is provided for actuating the working equipment of a construction vehicle preferably made as a wheel loader. In this context hydraulic cylinders arranged in an open hydraulic circuit, by means of which a loading scoop or suchlike can be actuated, are supplied with a corresponding working pressure.

Both the shift elements K1 to K3 and also the drive direction shift elements KR and KV are in the form of frictional shift elements, so that non-synchronous range changes between the driving ranges that can be engaged and disengaged by means of the three shift elements K1 to K3 can be carried out.

The planetary transmission device 17 in this case comprises two sun gears 32, 33 which mesh with common double-planetary wheels 34 which, in turn, are mounted to rotate on a planetary gear carrier 35. The other countershaft 31 of the reversing gear unit 6 can be brought by means of the drive direction shift elements KV and KR into active connection with the planetary carrier 35 of the planetary transmission device 17, while the pump 20 of the hydrostatic device 12 is connected to the small sun gear 33 of the planetary transmission device 17. The large sun gear 32 of the planetary transmission device 17 is connected in a rotationally fixed manner to a gearwheel 37 through a ring gear 36 of the planetary transmission device 17 made as a hollow shaft.

As a function of displacement of the motor 21 and a delivery volume of the pump 20, at least part of the torque applied by the drive machine 7 can be transmitted, via the large sun gear 32 of the planetary transmission unit 17, to the second power branch 13 containing the mechanical device 14.

Basically, in the example embodiment of the vehicle drivetrain 1 represented in FIG. 2 the drive input of the drive machine 7 is passed by the drive direction clutch KR or KV to the planetary carrier 35 of the planetary transmission unit 17. Starting from the planetary carrier 35, the torque is divided by the double-planetary gears 34 and part of it is passed on via the small sun gear 33 and used for driving the pump 20. The mechanical drive output of the other part of the drive output torque of the drive machine 7 passes via the large sun gear 32 of the planetary transmission unit 17 and the gearwheel 37 or the ring gear 36 and a gearwheel 38 in turn connected in a rotationally fixed manner thereto.

If the motor 21 is static and the pump 20 is rotating at its maximum speed, the displacement of the motor 21 is a maximum whereas the delivery volume of the pump 20 is zero. Thus, no drive power is transmitted to the drive output. It is then possible to support torque acting from the vehicle completely hydraulically. If now, starting from this position of the hydrostats, the delivery volume of the pump 20 is increased and if necessary the displacement of the motor 21 is reduced at the same time, then on the one hand the pump 20 begins delivering oil and taking up torque, and on the other hand the motor 21 begins turning and supplying a torque.

To maintain torque equilibrium at the planetary transmission 17, from the moment when the pump 20 takes up torque it is braked. Thus, from when movement begins some power flows mechanically.

The second limit of the driving ranges that can be obtained with the shift elements K1 to K3 exists when the pump 20 is static and the speed of the motor 21 is at a maximum, the displacement of the motor 21 then being zero and the delivery volume of the pump 20 at its maximum. In this operating condition of the hydrostatic device 12, the drive power of the drive machine 7 is transmitted via the transmission unit 3 completely mechanically by the other countershaft 31 of the reversing gear system 6 to the transmission output shaft 16 of the transmission unit 3.

The largest transmission ratio can be obtained in the first driving range that can be engaged by means of the first shift element K1, whereas medium transmission ratios can be obtained in the second driving range that can be engaged using the second shift element K2 and the lowest transmission ratio in the third driving range that can be engaged using the third shift element K3. Furthermore, the three driving ranges are designed in such manner that the first driving or transmission ratio range and the second transmission ratio range and the third transmission ratio range overlap so that the transmission ratio in the transmission unit 3 can be changed over the full transmission ratio range of the transmission unit 3, which extends from the lower transmission ratio limit of the first driving range up to the upper transmission ratio limit of the third driving range, in a continuous manner, free from traction force interruptions and hardly perceptible by a driver of a vehicle built with the transmission unit 3.

In the first driving range engaged using the first range clutch K1, depending on the operating condition of the hydrostatic device 12 the drive torque of the drive machine 7 is transmitted at least in part by the motor 21 via a spur gear 39 connected in a rotationally fixed manner thereto and a further spur gear 40 that meshes with the latter. The said further spur gear 40 is mounted to rotate on the countershaft 24 and can be connected by means of the first shift element K1 rotationally fixed to a gearwheel 41, which is also made as a spur gear and is connected in a rotationally fixed manner on the countershaft 24. This means that with a corresponding transmission capacity of the first shift element K1 made as a friction clutch, the hydraulically transmitted part of the torque of the drive machine passes to the spur gear 41. In turn, the spur gear 41 meshes with another gearwheel 42 connected in a rotationally fixed manner to the transmission output shaft 16, by which the torque can be transmitted to the driveshaft of the vehicle.

The other part of the drive torque of the drive machine 7, when the first driving range is engaged, is passed by the large sun gear 32 and the gearwheel 38 connected in a rotationally fixed manner thereto and by a further gearwheel 43 that meshes with it, to the countershaft 23 which is connected in a rotationally fixed manner to the motor 21 and the spur gear 39. Thus, the part of the drive torque of the drive machine 7 passed on by the mechanical device 14 is superposed on the part of the drive torque transmitted by the hydrostatic device 12 already in the area of the countershaft 23, and then passed on conjointly, via the spur gears 39, 40, 41 and 42, to the transmission output shaft 16.

When the second driving range is engaged, then a fraction of the drive torque of the drive machine 7 that depends on the operating condition of the hydrostatic device 12 is passed by the motor 21, via the countershaft 23 and the gearwheel 43 connected in a rotationally fixed manner thereto, to the gearwheel 38 connected in a rotationally fixed manner to the ring gear 36 of the planetary transmission unit 17. In the planetary transmission unit 17, the torque applied to the ring gear 36 is superposed on the part of the drive torque of the drive machine 7 applied to the large sun gear 32 and then transmitted, via the gearwheel 37, to a further gearwheel 44 mounted to rotate on the countershaft 25, and which meshes with the gearwheel 37. Since when the second range clutch K2 is engaged the gearwheel 44 is connected in a rotationally fixed manner to the countershaft 25, the torque applied to the gearwheel 44 is passed on to a gearwheel 45 connected in a rotationally fixed manner to the countershaft 25, which in turn meshes with the gearwheel 41 of the countershaft 24 so that the torque is transmitted from the spur gear 41 to the gearwheel 42 and therefore to the transmission output shaft 16.

If the third driving range is engaged in the transmission unit 3, then a fraction of the drive torque of the drive machine 7 that depends on the current operating condition of the hydrostatic device 12 is passed on via the first power branch 11, hydraulically by the motor 21 via the third range clutch K3 and via a gearwheel 46 that can be connected in a rotationally fixed manner by the third shift element K3 to the countershaft 23, a gearwheel 47 which meshes with it, which is connected to the countershaft 24, and the spur gear 41 also connected in a rotationally fixed manner to the countershaft 24, to the gearwheel 42 and the transmission output shaft 16. At the same time the other part of the drive torque of the drive machine 7 is passed along the second power branch 13 of the transmission unit 3, via the double-planetary gears 34 and the ring gear 36 of the planetary transmission unit 17, to the countershaft 23 and is there superposed on the torque delivered by the motor 21 and passed on, via the gearwheel chain already described, to the transmission output shaft 16.

To engage one of the three driving ranges, in each case one of the shift elements K1 to K3 must be adjusted to a transmission capacity at which a torque to be passed on from the transmission unit 3 can be transmitted in full by one of the shift elements K1 to K3. This means that when the first driving range is engaged, the first shift element K1 is pressurized with a working pressure at which the first shift element K1 is completely engaged. In this operating condition of the transmission unit 3 the other two shift elements K2 and K3 are essentially depressurized and are therefore in the disengaged condition.

When changing from the first to the second driving range, starting from the first shift element K1 a load transfer toward the second shift element K2 takes place, so that the first shift element K1 is the one to be disengaged and the second shift element K2 is the one to be engaged. When a change from the second to the third driving range is required, the second shift element K2 is disengaged and the third shift element K3 is engaged.

If now a change, respectively from the third to the second driving range or from the second to the first driving range is required, then respectively the third shift element K3 or the second shift element K2 is the one to be disengaged while the second shift element K2 or the first shift element K1 is the one to be engaged.

Since in the area of the mechanical device 14 a change of the driving range also changes the transmission ratio fixed in each case by the various gearwheels of the mechanical device 14, in the area of the hydrostatic device 12 a change of the transmission ratio is carried out in the area of the hydrostatic device 12 by adjusting the displacement of the motor 21 and the delivery volume of the pump 20, with the result that at the end of the driving range change the transmission ratio in the transmission unit 3 as a whole is the same as it was before the driving range change and the overall transmission ratio of the transmission unit 3 can be varied continuously over the full operating range of the transmission unit 3.

By virtue of the hydraulic device 4 arranged in the power flow between the reversing gear system 6 and the drive machine 7, a vehicle made with the vehicle drivetrain 1 can be operated purely hydraulically or purely hydrostatically, so that the drive machine 7 then provides essentially no drive torque at the drive output 5 and is decoupled from the remainder of the vehicle drivetrain in the area of a shift element 60 or separating clutch arranged between the drive machine 7 and the reversing unit 6, so as not to introduce any drag torques that would compromise the hydraulic drive into the vehicle drivetrain 1. In addition, when the shift element 60 is engaged hybrid driving operation can be obtained by means of the hydraulic device 4 and the drive machine 7, during which torque is introduced into the power flow of the vehicle drivetrain 1 both by the hydraulic device 4 and by the drive machine 7.

Such hybrid driving operation can take place both in traction operation and in thrust operation of the vehicle drivetrain 1. During thrust operation of the vehicle drivetrain 1, in the area of the hydraulic device 4 at least part of the drive torque to be supported can be used for recovering energy by recuperative operation of the hydraulic device 4 in the manner described later.

The hydraulic device 4 comprises a hydraulic machine 47 that can be operated in both rotational directions, which is connected via a spur gear pair 48 to the transmission input 15 in the area of the planetary carrier 35 of the planetary transmission unit 17. The hydraulic machine 47 is also built to swivel in both directions and the suction side and pressure side of the hydraulic machine 47 are identical over the entire operating range of the hydraulic machine 47. The spur gear pair 48 comprises a spur gear 50 connected in a rotationally fixed manner to an output shaft 49 of the hydraulic machine 47, which meshes with the gearwheel 29 of the reversing gear system 6.

The output shaft 49 of the hydraulic machine 47 is connected in a rotationally fixed manner to an auxiliary drive output shaft 52 by means of which further auxiliary outputs of the vehicle made with the vehicle drivetrain 1 can be driven.

The hydraulic machine 47 is actively connected on its suction side with a substantially unpressurized hydraulic fluid reservoir 54 and on its pressure side to a pressure medium container unit 55, which in the present case comprises three containers. The number of containers of the pressure medium container unit varies depending on the application in each case and on the extent of energy storage required. In the example embodiment of the device 2 represented in the drawing, the hydraulic fluid reservoir 54 is also the fluid reservoir of the vehicle's working machine. In other embodiments of the device the hydraulic fluid reservoir of the device is made separately from the fluid reservoir of the working machine, which emphasizes the modular nature of the device according to the invention.

Between the pressure side of the hydraulic machine 47 and the pressure medium container unit 55 is arranged a one-way valve device 56 that can be actuated, which blocks the connection between the hydraulic machine 47 and the pressure medium container unit 55, if there exists a positive pressure gradient between the pressure container device 55 and the pressure side of the hydraulic machine 47. This one-way valve device 56 can be actuated by means of 3/2-way valve 59, whereby the response behavior of the one-way valve device 56 can be varied as a function of pressure.

To enable a maximum operating pressure of the hydraulic device 4 to be limited, the hydraulic device 4 comprises a pressure-limiting valve device 57. In addition, a storage pressure of the pressure medium container unit 55 is determined by a pressure sensor 58. The pressure signal from the pressure sensor 58 is used for the operation strategy of the hybrid drive of the vehicle drivetrain 1. For example, if a storage pressure close to the gas filling pressure is determined, the displacement of the hydraulic machine 47 is reduced to zero.

If a positive torque or drive is to be introduced into the force flow of the vehicle drivetrain 1 by the hydraulic machine 47, the connection between the pressure medium container unit 55 and the hydraulic machine 47 is opened in the area of the unblocking one-way valve 56 by appropriately switching the 3/2-way valve. The pressure medium stored in the pressure medium container unit 55 then drives the hydraulic machine 47, in the area of which the hydraulic pressure is converted to mechanical energy. During this driving mode of the hydraulic machine 47 the pressure medium used from the pressure medium container unit 55 is delivered to the hydraulic machine 47 via its pressure side and then, via the suction side of the hydraulic machine 47, returned to the hydraulic fluid reservoir 54.

During a recuperative operation of the hydraulic device 4 part of the drive torque to be supported is passed into the hydraulic machine 47 by the spur gear pair 48. The hydraulic machine 47 draws hydraulic fluid out of the hydraulic fluid reservoir 54 and pumps it through the one-way valve device 56, which opens above a pre-set pressure level, into the pressure medium container unit 55. If a maximum operating pressure is reached in the area of the pressure-limiting valve device 57, the pressure-limiting valve device 57 opens a connection, upstream from the pressure medium container unit 55, between the pressure side of the hydraulic machine 47 and the hydraulic fluid reservoir 54, whereby excess hydraulic fluid flows back into the hydraulic fluid reservoir 54 through a cooler (not shown).

The advantage of the hydraulic shifting of the hydraulic device 4 is that the hydraulic fluid volume flow that passes in each case between the pressure medium container unit 55 and the hydraulic machine 47 in order to operate the latter does not pass through the 3/2-way valve but only through the one-way valve device that can be unblocked, so that hydraulic losses are low.

Basically, the hydraulic device 4 can be produced simply and inexpensively since it is made using conventional structural components. By virtue of the hybrid drive that can be obtained with the hydraulic device 4 and the drive machine 7, which can be in the form of a diesel internal combustion engine, the latter can be made smaller by comparison with conventional vehicle drivetrains. Moreover, by means of the hydraulic device 4 so-termed boost operation is possible, and the operating point of the drive machine 7 can also be displaced during a charging operation of the pressure medium container unit 55 on the part of the device.

INDEXES

1 Vehicle drivetrain
2 Device
3 Transmission unit
4 Hydraulic device
5 Drive output
6 Reversing gear system
7 Drive machine
8 Auxiliary drive output
9 Variator
10 Transmission group
11 First power path
12 Hydrostat device
13 Second power path
14 Mechanical device
15 Transmission input
16 Transmission output
17 Planetary gear system
18 Motor output shaft
19 Oscillation damper
20 Pump
21 Motor
22 Yoke
23-26 Countershaft
27 Transmission pump
28 Gearwheel pair
29, 30 Gearwheel
31 Further countershaft of the reversing gear system
32 Large sun gear
33 Small sun gear
34 Double planetary gear
35 Planetary carrier
36 Ring gear
37, 38 Gearwheel
39-41 Spur gear
42-46 Gearwheel
47 Hydraulic machine
48 Spur gear pair
49 Output shaft
50, 51 Spur gear
52 Auxiliary drive output shaft
54 Hydraulic fluid reservoir
55 Pressure medium container unit
56 One-way valve device
57 Pressure-limiting valve device
58 Pressure sensor
59 3/2-way valve
60 Shift element, separating clutch
K1 to K3 Range clutch
KV, KR Driving direction shift element

The invention claimed is:

1. A device (2), for a vehicle drivetrain (1), comprising:
a transmission unit (3) being continuously variable for achieving various transmission ratios, and the transmission unit (3) comprising a hydrostatic transmission;
a hydraulic device (4) for providing an additional source of power and a drive torque in an area of a drive output (5) of the vehicle drivetrain (1) and in whose area a drive output torque of the vehicle drivetrain (1) is at least partially supported upstream of the transmission unit (3);
a reversing gear system (6) being connected for reversing a rotational direction;

the hydraulic device (4) being actively connectable with the transmission unit (3) by the reversing gear system (6); and the hydraulic device (4) being connected to an auxiliary drive output shaft (52).

2. The device according to claim 1, wherein the hydraulic device (4) is actively connectable, via a first gearwheel (50), with a gearwheel (29) of the reversing gear system (6).

3. The device according to claim 1, wherein the hydraulic device (4) comprises a hydraulic machine (47) which is operable in both rotational directions.

4. The device according to claim 3, wherein the hydraulic machine (47) has a pressure side that is actively connected to a pressure medium container unit (55) and a suction side that is actively connected to a hydraulic fluid reservoir (54).

5. The device according to claim 4, wherein a one-way valve (56) is arranged between the pressure side of the hydraulic machine (47) and the pressure medium container unit (55), and the one-way valve (56) is actuated to block the connection between the hydraulic machine (47) and the pressure medium container unit (55) if a positive pressure gradient exists between the pressure medium container unit (55) and the pressure side of the hydraulic machine (47).

6. The device according to claim 5, wherein the one-way valve device (56) is actuated by a 3/2-way valve.

7. The device according to claim 1, wherein the hydraulic device (4) comprises a pressure-limiting valve device (57) for limiting a maximum operating pressure.

8. The device according to claim 4, wherein a pressure sensor (58) monitors a storage pressure of the pressure medium container unit (55).

9. The device according to claim 1, wherein a shift element is located between a connection area of the hydraulic device (4) and the reversing gear unit (6), and an area of the vehicle drivetrain (1) in which a drive machine (7) of the vehicle drivetrain (1) is coupled to the reversing gear unit (6), the shift element optionally produces the active connection between the drive machine (7) and the reversing gear unit (6) and the hydraulic device (4) that can be coupled thereto.

10. A device (2), for a vehicle drivetrain (1), comprising:
a transmission unit (3) being continuously variable for achieving various transmission ratios, and the transmission unit (3) comprising a hydrostatic transmission;
a hydraulic device (4) for providing an additional source of power and a drive torque in an area of a drive output (5) of the vehicle drivetrain (1) and in whose area a drive output torque of the vehicle drivetrain (1) is at least partially supported upstream of the transmission unit (3);
a reversing gear system (6) being connected for reversing a rotational direction; and
the hydraulic device (4) being actively connectable with the transmission unit (3) by the reversing gear system (6);
wherein a plurality of range clutches (K1, K2, K3) are provided, in an area of output (16) of the transmission unit (3), for obtaining various transmission ratio ranges, and within the area of output (16), the transmission ratio of the transmission unit (3) is varied continuously.

11. A device (2) for a vehicle drivetrain (1) with a transmission unit (3) for changing various transmission ratios, with a hydraulic device (4) by which a drive torque is provided in an area of a drive output (5) of the vehicle drivetrain (1) and in whose area a drive output torque of the vehicle drivetrain (1) is at least partially supported upstream of the transmission unit (3),
a reversing gear system (6) being connected for reversing a rotational direction,
the hydraulic device (4) being connected to the transmission unit (3) by the reversing gear system (6);
the hydraulic device (4) for providing an additional source of power to the vehicle drivetrain (1);
the transmission unit (3) being continuously variable and comprising a hydrostatic device (12), and the transmission unit (3) having two power branches (11, 13) which are connected via a planetary gear system (17) of the transmission unit (3);
the planetary gear system (17) comprising first and second sun gears (32, 33) meshing with common double planetary wheels (34);
a pump (20) of the hydrostatic device (12) being connected to the first sun gear of the planetary gear system (17); and
a planetary carrier (35) of the planetary gear system (17) is connectable to a countershaft (31) of the reversing gear unit (6).

\* \* \* \* \*